United States Patent [19]
Anderson

[11] 3,771,055
[45] Nov. 6, 1973

[54] DOUBLE NUCLEAR MAGNETIC RESONANCE COIL

[75] Inventor: Weston A. Anderson, Palo Alto, Calif.

[73] Assignee: Varian Associates, Palo Alto, Calif.

[22] Filed: Mar. 17, 1972

[21] Appl. No.: 235,832

Related U.S. Application Data

[63] Continuation of Ser. No. 31,892, April 27, 1970, abandoned.

[52] U.S. Cl. ............................................. 324/0.5 R
[51] Int. Cl. .......................................... G01n 27/78
[58] Field of Search .................... 324/0.5 R, 0.5 A, 324/0.5 AC, 0.5 AH; 331/3, 94

[56] References Cited
UNITED STATES PATENTS
3,329,890  7/1967  Kingston ............................ 324/0.5

Primary Examiner—Michael J. Lynch
Attorney—Stanley Z. Cole

[57] ABSTRACT

Double nuclear magnetic resonance coil structure and a spectrometer using same are disclosed. The coil structure comprises three radio frequency coils disposed with their respective magnetic axis in substantially orthoganal relation to each of the other two coils, whereby the coils are magnetically decoupled from each other while being radio frequency magnetic coupled to a nuclear sample disposed within the surrounding coils.

11 Claims, 3 Drawing Figures

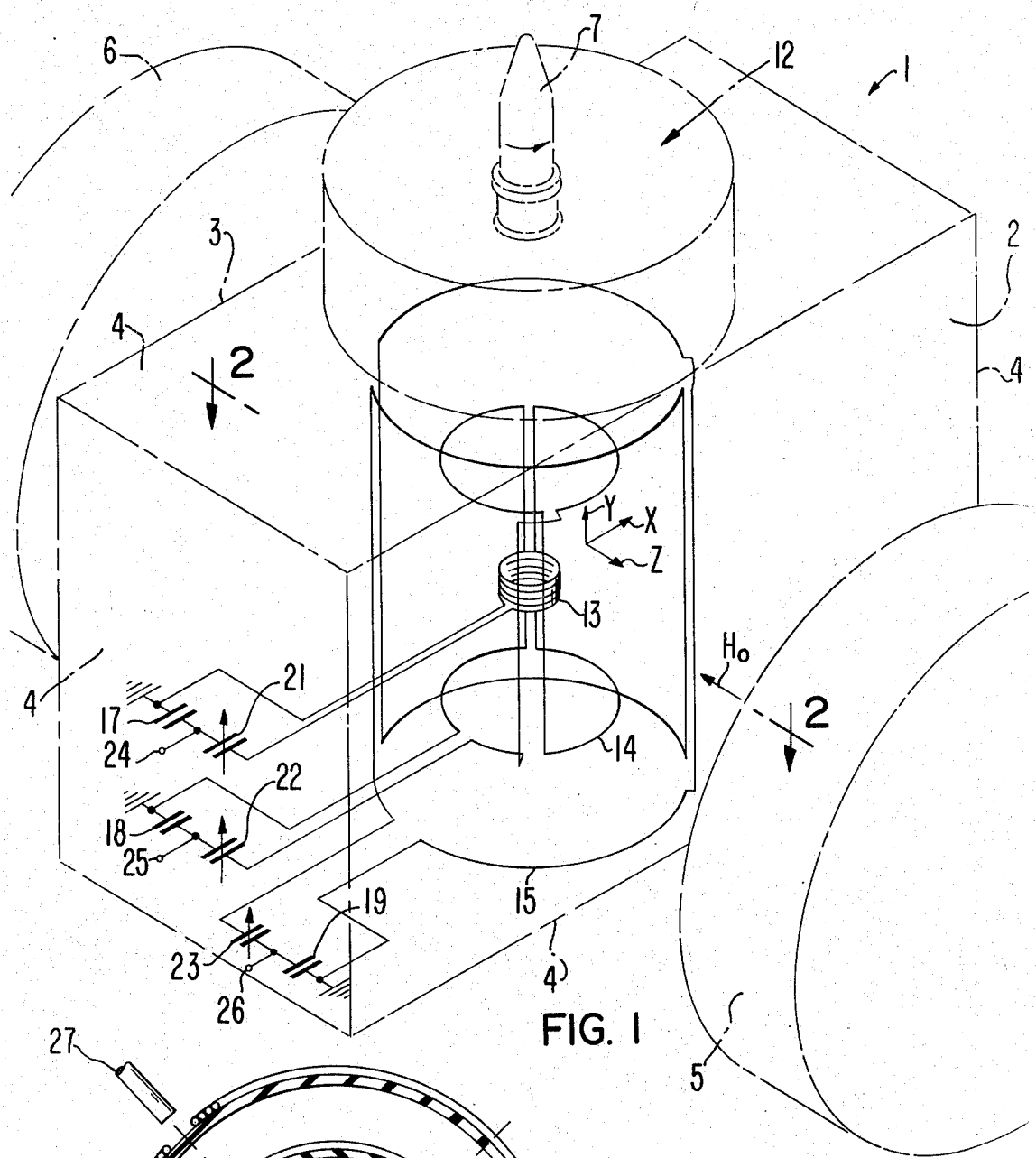

DOUBLE NUCLEAR MAGNETIC RESONANCE COIL

This is a continuation, of application Ser. No. 31,892 filed 27 Apr. 70, now abandoned.

DESCRIPTION OF THE PRIOR ART

Heretofore, radio frequency coil structures for double nuclear magnetic resonance spectrometers have included three radio frequency coils wound on three concentric tubular coil forms within the probe structure for exciting and detecting resonance of two groups of nuclei within the sample. Such a prior art coil structure and spectrometer using same is disclosed and claimed in U.S. Pat. No. 3,388,322 issued June 11, 1968 and assigned to the same assignee as the present induction.

One problem with the prior radio frequency coil arrangement is that two of the radio frequency coils have the same magnetic axis which is perpendicular to the polarizing magnetic field and which is also perpendicular to the magnetic axis of the third coil. As a result, the two radio frequency coils which have the same magnetic axis are relatively heavily coupled to each other by mutual inductance, thereby making independent tuning of the two coupled coils difficult in use.

SUMMARY OF THE PRESENT INVENTION

The principal object of the present invention is the provision of improved radio frequency coil structure for double nuclear magnetic resonance apparatus.

One feature of the present invention is the provision of first, second and third radio frequency coils — each disposed with its respective magnetic axis in substantially orthogonal relation to each of the other two coils, whereby the coils are radio frequency magnetically decoupled from each other while being radio frequency magnetically coupled to the nuclear magnetic moments of the sample under analysis.

Another feature of the present invention is the same as the preceding feature including a probe housing having a pair of broad walls interconnected by narrow walls to define a relatively thin probe housing and wherein the first radio frequency coil is disposed in the housing with its magnetic axis substantially parallel to the plane of the broad walls of the probe housing, whereby the first radio frequency coil is heavily coupled to the magnetic moments of the nuclear resonant sample.

Another feature of the present invention is the same as the immediately preceding feature wherein the second and third coils are each disposed in the housing with their respective magnetic axes inclined at an angle to the plane of the broad walls of the probe housing, whereby the second and third coils are radio frequency coupled to the magnetic moments of the nuclear sample.

Another feature of the present invention is the same as any one or more of the preceding features wherein the first, second and third ratio frequency coils are carried from and curve with wall of a tubular coil form having a longitudinal axis parallel to the magnetic axis of one of the coils.

Other features and advantages of the present invention will become apparent upon perusal of the following specification taken in connection with the accompanying drawings wherein:

BRIEF DESCRIPTION OF THE DRAWINGS

FIG. 1 is a schematic perspective view of a probe structure for a nuclear magnetic resonance spectrometer employing features of the nuclear invention, FIG. 2 is a cross-sectional view of the coil structures of FIG. 1 taken across the struture at line 2—2 and looking in the direction of the arrows.

DESCRIPTION OF THE PREFERRED EMBODIMENTS

Figure 3:
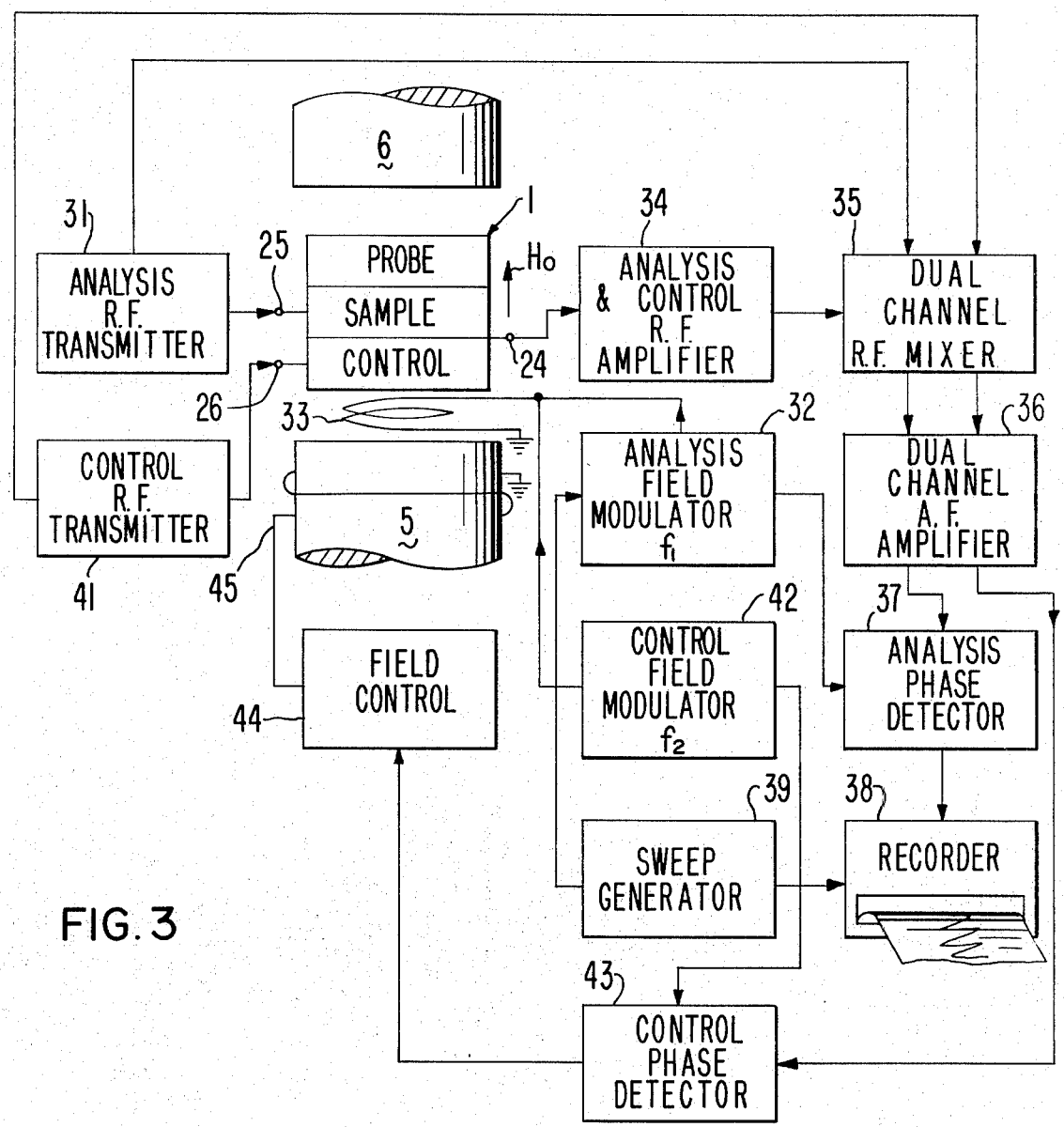
FIG. 3 is a schematic block diagram of a nuclear magnetic resonance spectrometer employing the features of the present invention.

Referring now to FIGS. 1 and 2, there is shown a nuclear magnetic resonance probe structure 1 and the radio frequency coils contained therein for a double nuclear magnetic resonance spectrometer. The double nuclear magnetic resonance coil structure is contained within a probe housing 1 having a generally rectangular and thin shape. More specifically, the probe housing 1 as of aluminum, has a pair of parallel broad walls 2 and 3 interconnected on four sides by narrow walls 4. In a typical example, the probe housing 1 has a thickness in the narrow dimension, as of 0.75 inch, and the broad walls 2 and 3 are generally rectangular having dimensions of several inches on a side. The probe housing 1 is inserted into the narrow magnetic gap between a pair of pole pieces 5 and 6 of a powerful electromagnet, not shown, producing a relatively strong DC polarizing magnetic field $H_o$ of an intensity on the order of 10 to 25 KG. The direction of the polarizing magnetic field $H_o$ is taken as the Z direction in a set of cartesian coordinates. Thus, the polarizing magnetic field $H_o$ is perpendicular to the plane of the broad walls 2 and 3 of the probe housing 1.

A sample vial 7, as of glass, for containing the sample nuclear resonance bodies to be analyzed or excited into resonance is inserted into the probe housing 1 along the Y axis coaxially of a plurality of coaxially disposed concentrically arranged coil forms 8, 9 and 11, respectively. An air turbine structure 12 is carried at the top of the probe housing 1 and is coupled to the vial 7 for spinning the vial, about the Y axis as an axis of revolution, to average out certain magnetic field gradients in the polarizing magnetic field $H_o$.

At least three radio frequency coils 13, 14 and 15, are disposed in the probe housing 1 in radio frequency magnetic field exchanging relation with the sample of nuclear magnetic resonance material carried within the vial 7. Each of the coils is wound upon and curves with a wall of one of the respective tubular coil forms 8, 9 and 11 of FIG. 2. The respective coils 13, 14 and 15 are wound on the respective coil forms such that the respective magnetic axis for each coil is substantially orthogonal to each of the magnetic axes of the other two coils, whereby the radio frequency coils are radio frequency magnetically decoupled from each other while being radio frequency magnetically coupled to the sample region within the vial 7. As used herein, "magnetic axis" is defined as the direction of the magnetic field vector of the radio frequency magnetic field at the geometric center of the coil.

For the coils 13, 14 and 15, coil 13 has a magnetic axis in the Y direction, coil 14 has a magnetic axis 16 lying in the XZ plane and inclined at 45° to both the X and Z axis and coil 15 has a magnetic axis 20, lying in the XZ plane at an angle of 45° to both the X and Z axis but also being 90° from the magnetic axis 16 of coil 14. In this manner, each of the coils has a magnetic axis which is orthogonal to each of the outer coils, such that there is no mutual inductive coupling between any of the coils, whereby the radio frequency coils may be tuned independently of each other without mutual interference. Also, each of the magnetic axes is inclined at a substantial angle to the direction of the polarizing magnetic field, i.e. the Z axis, such that radio frequency magnetic coupling is obtained to the nuclear magnetic moments of the sample material within the vial 7. The sample region of space is that portion of vial 7 disposed within and generally being axially coextensive with the smallest coil 14.

Each of the coils is tuned for a resonance frequency by means of a pair of capacitors connected across the respective coil. One of the capacitors is adjustable for tuning and the other capacitor has a value of capacitance to form a radio frequency voltage divider with the tuning capacity for matching the impedance of a transmission line. One end of the transmission line, not shown, is connected between ground and a center tap between the two capacitors of the radio frequency voltage divider. More specifically, fixed capacitors 17, 18 and 19, are series connected with variable capacitors 21, 22 and 23, respectively, across radio frequency coils 13, 14 and 15, respectively. Center taps 24, 25 and 26 provide terminals for connection of the transmission lines to the radio frequency coils 13, 14 and 15, respectively.

Two pairs of conventional magnetic coupling trimming paddles 27 and 28 are provided for separately trimming the absorptive and dispersive components of magnetic coupling between transmitter coils 14 and 15, respectively, and the receiver coil 13 to zero. Paddle pairs 27 and 28 each include a pair of paddles, only one of which is shown, disposed one above the other in the vertical plane containing the Y axis and the respective magnetic axis of the respective transmitter coil being trimmed.

Although the preferred arrangement of magnetic axes for coils 14 and 15 is at 45° to the Z axis, this is not a requirement as is, only a requirement that the magnetic axes of coils 14 and 15 be substantially orthogonal to eliminate mutual inductance between. While maintaining orthogonality of the magnetic axes of coils 14 and 15, these coils may be rotated about the Y axis such that their axes are merely inclined at an angle to the Z axis. In other words, this angle of inclination need not be 45°. However, 45° provides approximately equal magnetic coupling for both of the coils to the nuclear magnetic moments within the sample material. Also, coil 13 need not be oriented with its magnetic axis perpendicular to the polarizing magnetic field, it need only be oriented with its magnetic axis at an angle to the polarizing magnetic field. However, optimum coupling is obtained to the magnetic moments of the nuclear sample when the magnetic axis of coil 13 is perpendicular to the polarizing magnetic field. However, the magnetic axis of coil 13 should be substantially orthogonal to the magnetic axs of coils 14 and 15 to prevent mutual inductive coupling therebetween.

The three orthogonal radio frequency coils 13, 14 and 15 may be utilized in a number of different ways in various different nuclear magnetic resonance spectrometers of the type wherein nuclear magnetic resonance is excited in different groups of nuclear magnetic resonant bodies within the sample region. More specifically, the two different groups of nuclear magnetic resonant bodies need not be different nuclei but may comprise, for example, groups of nuclei having slightly different resonant frequencies, such frequency shifts being produced, for example, by chemical shift. Typical examples of nuclear magnetic resonance spectrometers employing resonance of different groups of nuclear magnetic resonant bodies are spectrometers utilizing resonance of one group for field-frequency control of the spectrometer and resonance of the other group to obtain resonance information concerning a sample under analysis. In another type of double resonance spectrometer, one nuclear magnetic resonance group is irradiated with radio frequency energy while a second group is excited into resonance and the resonance detected for analysis thereof.

Referring now to FIG. 3 there is shown a double resonance nuclear magnetic resonance spectrometer incorporating features of the present invention. The spectrometer includes a probe structure 1 containing a sample group and a control group of nuclear magnetic resonance bodies within the sample vial 7. The probe 1 is inserted between the pole pieces 5 and 6 of a powerful electromagnet, not shown, to produce the polarizing magnetic field $H_o$. Contained within the probe arc the three coils 13, 14 and 15 with orientations as illustrated in FIGS. 1 and 2. An analysis R.F. transmitter 31 having a radio frequency output displaced from the nuclear magnetic frequency of the sample by an audio frequency $f_1$ supplies radio frequency energy to transmitter coil 14 via input terminal 25. An analysis field-modulation generator 32 applies audio frequency energy to a field modulation coil 33 for modulating the polarizing magnetic field $H_o$ at the audio frequency $f_1$ which when combined with the radio frequency of the analysis transmitter 31 produces a radio frequency sideband in the sample material at a nuclear resonance frequency of one of the groups of sample nuclei to excite nuclear magnetic resonance of that group. Radio frequency energy emanating from the resonant group of sample nuclei is picked up in receiver coil 13 and transmitted to the input of an analysis and control R.F. amplifier 34 which is connected to receiver coil 13 via terminal 24. The analysis and control R.F. amplifier 34 amplifies the radio frequency resonance signal and feeds it to one input of a dual channel R.F. mixer 35 wherein it is mixed with a sample of the output of the analysis R.F. transmitter 31 to produce a resonance audio signal at the analysis field modulation frequency $f_1$.

The audio output of the R.F. mixer is fed to one input of a dual channel analysis and control audio frequency amplifier 36 wherein it is amplified and fed to one input of an analysis phase detector 37 to be compared with a sample of the analysis field modulation frequency $f_1$ to produce a DC resonance signal output which is fed to a recorder 38 to be recorded as a function of a sweep signal produced by sweep generator 39 which sweeps the frequency of the analysis field modulation frequency $f_1$ through the spectrum of the sample under analysis to obtain an output spectrum on the recorder 38.

Fluctuations in the polarizing magnetic field intensity $H_o$ are corrected by means of a control group of nuclear magnetic resonance bodies disposed in the sample vial 7. The control group may be either intermixed with the sample group or partitioned from the sample group by means of a partitioning wall in the vial 7. The control channel includes a control R.F. transmitter 41 which generates a radio frequency transmitter signal having a frequency displaced from the resonance frequency of the control group by an audio frequency $f_2$. The control transmitter energy is fed to transmitter coil 15 via input terminal 26. A control field modulator 42 generates an audio frequency at $f_2$ which is fed to the field modulation coil 33 for modulating the polarizing magnetic field at the control field modulation frequency $f_2$ such that the audio frequency $f_2$ combines with the control R.F. transmitter frequency to produce sideband resonance of the control group within the probe.

Resonance signals emanating from the control group of nuclear magnetic resonance bodies are picked up in the receiver coil 13 and fed into the analysis and control R.F. amplifier 34 via terminal 24. The control radio frequency energy is amplified by amplifier 34 and fed to the second input of the dual channel R.F. mixer 35 wherein it is mixed with a sample of the control transmitter frequency derived from control transmitter 41 to produce an audio control resonance signal at the control field modulation frequency $f_2$ which is then fed to the second input of the dual channel analysis and control audio frequency amplifier 36.

The output of the audio frequency amplifier 36 is fed to one input of a control phase detector 43 for phase detection against a sample of the control modulator 42 to obtain an output field control signal having a phase and magnitude dependent upon the departure of the polarizing magnetic field intensity from that value required to sustain resonance of the control group. The control signal is fed to a field control 44 which corrects the magnetic field intensity $H_o$ by feeding an output current through a coil 45 to produce a field corrective component superimposed on the DC polarizing magnetic field $H_o$.

Although the probe housing 1 has been shown as having a generally rectangular cross section configuration it may take other shapes, such as an elongated cylinder, with an axis of revolution parallel to the magnetic axis of coil 13. In this configuration the probe would have only one circular broad wall closed at its ends by disc-shaped narrow side walls.

Although the three R.F. coil double resonance spectrometer of FIG. 3 has been described with coils 14 and 15 used as transmitter coils in a croned-coil system other uses for the coils are contemplated. For example, in an alternative double resonance spectrometer, coil 15 would be the analysis channel transmitter coil, coil 14 would be a spin decoupling transmitter coil and coil 13 would be the receiver coil of the crossed-coil analysis channel. In still another alternative embodiment, coil 15 would be the analysis channel transmitter coil, coil 14 would be a single transmitter and receiver coil for a single coil field-frequency control channel, and coil 13 would be the receiver coil of the crossed-coil analysis channel.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a double nuclear magnetic resonance apparatus, first, second and third radio frequency coil means disposed in radio frequency magnetic field exchanging relation with a region of space to contain first and second groups of nuclear magnetic resonance bodies, and each of said first, second and third coil means being disposed with their respective magnetic axes in substantially orthogonal relation to the magnetic axes of the other two coils, whereby said first, second, and third coil means are substantially radio frequency magnetically decoupled from each other while being radio frequency magnetically coupled to both the first and second groups of nuclear magnetic resonance bodies, including electrically conductive probe housing means for containing therein said first, second and third coil means and for immersing said coil means and sample region of space in a polarizing magnetic field, said probe housing means having a relatively broad wall means interconnected by relatively narrow side wall means to define a relatively thin probe housing, and wherein said first coil means is disposed in said probe housing with its magnetic axis substantially parallel to the plane of said broad wall means of said probe housing means, including a radio frequency receiver coupled to said first coil means for detecting radio frequency resonance signals emanating from one of the groups of nuclear resonant bodies within the common region of space containing such bodies, and radio frequency transmitter means coupled to said second and third coil means for supplying radio frequency energy to said second and third coil means for exciting radio frequency resonance of the first and second groups of nuclear resonant bodies within the common region of space containing such bodies.

2. In a double nuclear magnetic resonance method, the steps of, disposing first, second and third radio frequency coils in radio frequency magnetic field exchanging relation with a common region of space to contain first and second groups of nuclear magnetic resonance bodies, orienting each of said first, second and third radio frequency coils with its respective magnetic axes in substantially orthogonal relation to the magnetic axis of the other two coils whereby said first, second and third radio frequency coils are substantially radio frequency magnetically decoupled from each other while being radio frequency magnetically coupled to the first and second groups of nuclear magnetic resonance bodies, and exciting the first and second radio frequency coils with radio frequency energy to excite radio frequency magnetic resonance of the first and second groups of nuclear magnetic resonance bodies, and coupling a receiver to said third radio frequency coil for detecting radio frequency resonance signal emanating from one of the groups of nuclear magnetic resonance bodies within the common region of space containing such bodies.

3. The method of claim 2 including the step of, enclosing the first, second and third radio frequency coils in a common electrically conductive probe structure.

4. In a double nuclear magnetic resonance apparatus, first, second and third radio frequency coil means disposed in radio frequency magnetic field exchanging relation with a sample holder containing a first and second group of nuclear magnetic resonance bodies, said sample holder having an elongated axis and each of said first, second and third coil means being disposed with their respective magnetic axes in substantially orthogonal relation to the magnetic axes of the other two coils, said first, second and third coils being disposed so that their respective magnetic axes intersect, said point of intersection being at said axis of said sample holder, whereby said first, second, and third coil means are substantially radio frequency magnetically decoupled from each other while being radio frequency magnetically coupled to both the first and second groups of nuclear magnetic resonance bodies.

5. The apparatus of claim 4, including probe housing means for housing said first, second and third coil means and for immersing said coil means and sample region of space in a polarizing magnetic field, said probe means having a relatively broad wall means interconnected by relatively narrow side wall means to define a relatively thin probe housing, and wherein said first coil means is disposed in said probe housing with its magnetic axis substantially parallel to the plane of said broad wall means of said probe housing means.

6. The apparatus of claim 5 including tubular coil form means disposed within said probe housing means and wherein said first, second and third coil means are carried from and curve with said tubular coil form means, and wherein said coil form means is elongated in a direction generally parallel to the magnetic axis of said first coil means.

7. The apparatus of claim 4 wherein each of the said coil means is disposed with its magnetic axis at an angle to the direction of the polarizing magnetic field within the region of space to contain the first and second groups of nuclear magnetic resonance bodies.

8. In a double nuclear magnetic resonance apparatus, first, second and third radio frequency coil means disposed in radio frequency magnetic field exchanging relation with a region of space to contain first and second groups of nuclear magnetic resonance bodies, and each of said first, second and third coil means being disposed with their respective magnetic axes in substantially orthogonal relation to the magnetic axes of the other two coils, whereby said first, second and third coil means are substantially radio frequency magnetically decoupled from each other while being radio frequency magnetically coupled to both the first and second groups of nuclear magnetic resonance bodies, including electrically conductive probe housing means for containing therein said first, second and third coil means and for immersing said coil means and sample region of space in a polarizing magnetic field, said probe housing means having a relatively broad wall means interconnected by relatively narrow side wall means to define a relatively thin probe housing, and wherein said first coil means is disposed in said probe housing with its magnetic axes substantially parallel to the plane of said broad wall means of said probe housing means wherein said probe housing means is of generally rectangular cross section having a pair of broad walls interconnected by narrow side walls, and wherein said second and third coil means are each disposed in said probe housing means with their respective magnetic axes inclined at an angle to the plane of said broad wall means of said probe housing.

9. The apparatus of claim 4 wherein said second and third coil means have their magentic axes each substantially inclined at a 45 degree angle to the plane of said broad walls of said probe housing.

10. In a double nuclear magnetic resonance apparatus, first, second and third radio frequency coil means disposed in radio frequency magnetic field exchanging relation with a region of space to contain first and second groups of nuclear magnetic resonance bodies, and each of said first, second and third coil means being disposed with their respective magnetic axes in substantially orthogonal relation to the magnetic axes of the other two coils, whereby said first, second and third coil means are substantially radio frequency magnetically decoupled from each other while being radio frequency magnetically coupled to both the first and second groups of nuclear magnetic resonance bodies, including electrically conductive probe housing means for containing therein said first, second and third coil means and for immersing said coil means and sample region of space in a polarizing magnetic field, said probe housing means having a relatively broad wall means interconnected by relatively narrow side wall means to define a relatively thin probe housing, and wherein said first coil means is disposed in said probe housing with its magnetic axis substantially parallel to the plane of said broad wall means of said probe housing means, including tubular coil form means having generally only one longitudinal axis and being disposed within said probe housing means and wherein said first, second and third coil means are all carried from and curve with said tubular coil form means, and wherein said coil form means is elongated in a direction generally parallel to the magnetic axis of said first coil means, wherein said coil form means comprises three coaxially disposed concentrically arranged tubular coil forms, each coil form having a respective one of said coil means carried from the wall thereof.

11. In a double nuclear magnetic resonance apparatus, a probe structure including a housing having a wall with an aperture therethrough for receiving a sample holder, said sample holder being a sample vial for containing both a first and a second group of nuclear magnetic resonance bodies, first, second and third radio frequency coil means disposed in radio frequency magnetic field exchanging relation with said sample vial, and each of said first, second and third coil means being disposed with their respective magnetic axes in substantially orthogonal relation to the magnetic axes of the other two coils, whereby said first, second, and third coil means are substantially radio frequency magnetically decoupled from each other while being radio frequency magnetically coupled to both the first and second groups of nuclear magnetic resonance bodies.

* * * * *